(12) United States Patent
Lerg (10) Patent No.: US 8,783,605 B2
(45) Date of Patent: Jul. 22, 2014

(54) FLIGHT VEHICLE, PROPULSION SYSTEM AND THRUST VECTORING SYSTEM

(75) Inventor: Bryan Henry Lerg, Westfield, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 12 days.

(21) Appl. No.: 13/336,301

(22) Filed: Dec. 23, 2011

(65) Prior Publication Data

US 2012/0256044 A1 Oct. 11, 2012

Related U.S. Application Data

(60) Provisional application No. 61/427,590, filed on Dec. 28, 2010.

(51) Int. Cl.
*B64B 1/36* (2006.01)

(52) U.S. Cl.
USPC ............................. 244/52; 60/204; 239/265.17

(58) Field of Classification Search
USPC .................... 244/52, 53 R; 60/229, 230, 770
See application file for complete search history.

(56) References Cited

U.S. PATENT DOCUMENTS

| | | | | |
|---|---|---|---|---|
| 5,694,766 A * | 12/1997 | Smereczniak et al. | ......... | 60/204 |
| 6,298,658 B1 * | 10/2001 | Bak | ................................. | 60/231 |
| 6,378,781 B1 * | 4/2002 | Vicario | .................... | 239/265.39 |
| 6,857,600 B1 * | 2/2005 | Walker et al. | ............... | 244/73 R |
| 7,225,623 B2 * | 6/2007 | Koshoffer | ........................ | 60/776 |
| 7,395,657 B2 * | 7/2008 | Johnson | ........................ | 60/226.1 |
| 7,654,363 B2 * | 2/2010 | Crosta et al. | ..................... | 181/213 |
| 8,322,126 B2 * | 12/2012 | Bies et al. | ........................ | 60/39.5 |
| 2003/0126861 A1 * | 7/2003 | Friedlander et al. | ............ | 60/771 |
| 2007/0266712 A1 * | 11/2007 | Brunet et al. | .................... | 60/771 |
| 2008/0217101 A1 * | 9/2008 | Crosta et al. | .................. | 181/213 |
| 2012/0168526 A1 * | 7/2012 | Fisenko | ............................ | 239/1 |
| 2012/0317957 A1 * | 12/2012 | Pesyna et al. | ................... | 60/204 |

OTHER PUBLICATIONS

International Search Report and Written Opinion, PCT/US2011/067301, Rolls-Royce North American Technologies Inc., Apr. 17, 2012.

* cited by examiner

*Primary Examiner* — Christopher P Ellis
*Assistant Examiner* — Medhat Badawi
(74) *Attorney, Agent, or Firm* — Krieg DeVault LLP (57) ABSTRACT

One embodiment of the present invention is a unique flight vehicle. Another embodiment is a unique propulsion system. Another embodiment is a unique thrust vectoring system. Other embodiments include apparatuses, systems, devices, hardware, methods, and combinations for flight vehicles, propulsion systems and thrust vectoring systems. Further embodiments, forms, features, aspects, benefits, and advantages of the present application will become apparent from the description and figures provided herewith.

14 Claims, 5 Drawing Sheets

FLIGHT VEHICLE, PROPULSION SYSTEM AND THRUST VECTORING SYSTEM

CROSS REFERENCE TO RELATED APPLICATIONS

The present application claims benefit of U.S. Provisional Patent Application No. 61/427,590, filed Dec. 28, 2010, entitled FLIGHT VEHICLE, PROPULSION SYSTEM AND TRUST VECTORING SYSTEM, which is incorporated herein by reference.

GOVERNMENT RIGHTS

The present application was made with the United States government support under Contract No. F33615-03-D-2357, awarded by the United States Air Force. The United States government may have certain rights in the present invention.

FIELD OF THE INVENTION

The present invention relates to flight vehicles, and more particularly, to propulsion systems and thrust vectoring systems for flight vehicles.

BACKGROUND

Flight vehicles, flight vehicle propulsion systems and flight vehicle thrust vectoring systems remain an area of interest. Some existing systems have various shortcomings, drawbacks, and disadvantages relative to certain applications. Accordingly, there remains a need for further contributions in this area of technology.

SUMMARY

One embodiment of the present invention is a unique flight vehicle. Another embodiment is a unique propulsion system. Another embodiment is a unique thrust vectoring system. Other embodiments include apparatuses, systems, devices, hardware, methods, and combinations for flight vehicles, propulsion systems and thrust vectoring systems. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Figure 1:
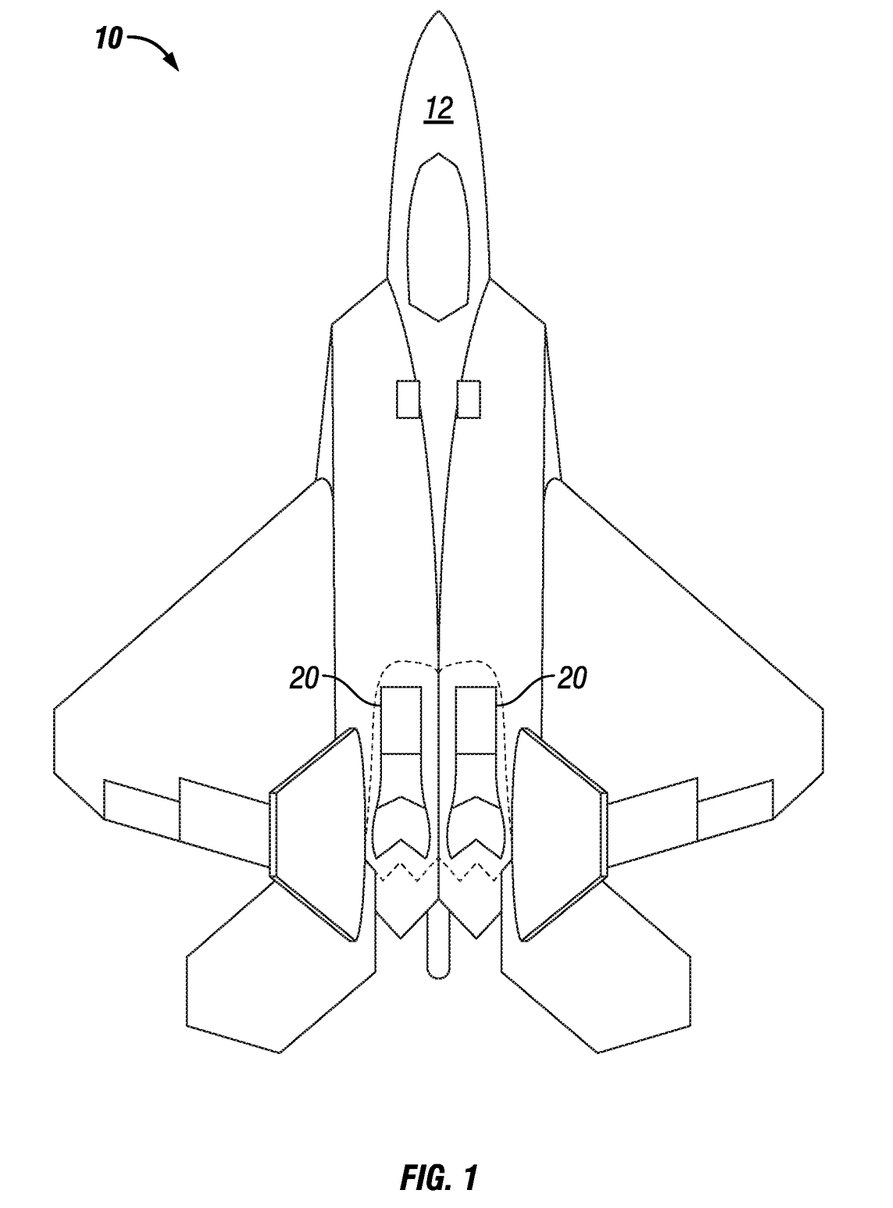
FIG. 1 schematically illustrates some aspects of a non-limiting example of a flight vehicle in accordance with an embodiment of the present invention.

Referring to the drawings, and in particular FIG. 1, some aspects of a non-limiting example of a flight vehicle 10 are schematically depicted. In one form, vehicle 10 is an air-vehicle, e.g., such as a fixed-wing aircraft. In other embodiments, vehicle 10 may be any airborne and/or space-borne vehicle, e.g., such as a missile, a rocket, a spacecraft or a satellite, or may be a water-borne vehicle, such as a surface vessel or a subsurface vessel. In one form, vehicle 10 includes one or more flight structures 12, e.g., one or more of a fuselage, a wing, an empennage or another flight structure. In other embodiments, flight structure 12 may take other forms, whether lift-producing or not. In one form, vehicle 10 includes two propulsion systems 20. In other embodiments, vehicle 10 may include a greater or lesser number of propulsion systems.

Referring to FIGS. 2A-2E, a non-limiting example of a propulsion system 20 in accordance with an embodiment of the present invention is schematically depicted. Propulsion system 20 is operative to provide propulsive thrust to vehicle 10 by discharging a pressurized flow in a primary thrust direction 22 that is generally opposite the direction of travel of vehicle 10. The pressurized flow is a pressurized fluid flow. In one form, the fluid is air and hydrocarbon fuel combustion products. In other embodiments, the fluid may be any vapor, gas and/or liquid. In various forms, propulsion system 20 may be configured to provide primary propulsion for vehicle 10 and/or to provide steering thrust. All or a portion of propulsion system 20 may be covered, e.g., by a cowling (not shown), in order to reduce parasitic drag. As illustrated in the top view depicted in FIG. 2A, propulsion system 20 includes an engine 30, a transition duct 40 and a nozzle system 50.

Nozzle system 50 includes a nozzle 52. In one form, nozzle 52 is a converging nozzle. In one form, nozzle system 50 also includes a diverging nozzle 54, and in such embodiments, nozzle system 50 is in the form of a supersonic converging-diverging nozzle. In one form, diverging nozzle 54 is a single expansion ramp nozzle having a single expansion ramp 56. In other embodiments, diverging nozzle 54 may take other forms. In still other embodiments, nozzle system 50 may not include a converging nozzle and/or may not include a diverging nozzle, e.g., wherein nozzle system 50 is configured to direct flow without respectively contracting and/or expanding the flow area along the length of nozzle system 50.

Engine 30 is mounted to flight structure 12. Engine 30 is operative to generate a pressurized flow for discharge via nozzle system 50 for providing propulsive thrust to flight structure 12. In one form, engine 30 is a gas turbine engine. In other embodiments, engine 30 may be any engine or system operative to provide a pressurized flow suitable for use in providing propulsion and/or vectoring thrust to an airborne and/or space-born vehicle or a water-borne vehicle.

Transition duct 40 is in fluid communication with engine 30 and with converging nozzle 52. Transition duct 40 is configured to transition the pressurized airflow from one flow area geometry, e.g., an annular flow area at the discharge of engine 30, to the flow area geometry corresponding to the inlet of converging nozzle 52, for example, as illustrated in the side view depicted in FIG. 2B. In one form, transition duct 40 has a constant flow area, changing only in flow area shape from one point to another along its length. In other embodiments, transition duct may include portions having constant flow area and/or have portions configured expand and/or contract the flow area. For example, in some embodiments, transition duct 40 may be considered a part of nozzle 52.

Nozzle system 50 is configured to receive pressurized flow provided by engine 30. In one form, nozzle system 50 is configured to accelerate the pressurized flow. In other embodiments, nozzle system may not be configured to accelerate the pressurized flow. Nozzle system 50 includes an inflected throat 70 formed at the end of converging nozzle 52. In one form, nozzle system 50 is a high aspect ratio nozzle, e.g., having a substantially greater width than height. In one form, throat 70 includes an inflection 72, a throat portion 74 and a throat portion 76. In one form, throat portion 74 and throat portion 76 are linear. In other embodiments, inflected throat 70 may have more than one inflection, and/or may have linear and/or curved throat portions extending in one or more directions between each pair of inflections and between the inflections and the outer extents of throat 70 adjacent thereto. Also, in other embodiments, throat 70 may have more than two throat portions. Throat portion 74 extends from one side of inflection 72, and has a throat area A1. Throat portion 76 extends from the other side of inflection 72, and has a throat area A2. In one form, throat areas A1 and A2 are the same in magnitude. In other embodiments, throat areas A1 and A2 may be different in magnitude.

In one form, throat 70 is continuous, i.e., not partitioned to separate throat portions such as throat portions 74 and 76 from each other. In other embodiments, throat 70 may not be continuous, and may include, for example, one or more partitions to separate throat portions, e.g., a partition located at inflection 72 to separate throat portions 74 and 76. In one form, throat portions 74 and 76 lie in a common plane, e.g., a plane parallel to the view of FIG. 2A. In other embodiments, throat portions 74 and 76 may lie in different planes, e.g., intersecting planes, for example, forming a "V" shape or an inverted "V" shape when viewed in the direction of FIG. 2C. In yet other embodiments, one or more additional throat portions may extend from inflection 72 in one or more additional planes that intersect(s) with the planes in which in which throat portions 74 and 76 lie, for example, forming an "X" shape, a "Y" or inverted "Y" shape, or a "+" shape when viewed in the direction of FIG. 2C. In still other embodiments, throat 70 may include throat portions that extend in planes that are parallel to each other. In embodiments wherein nozzle system 50 is configured to direct flow without contracting and/or expanding the flow area along the length of nozzle system 50, inflected throat 70 is considered the portion of nozzle 52 adjacent the nozzle outlet.

Throat portion 74 and throat portion 76 each face in different directions. For example, in the embodiment shown in FIG. 2A, throat portion 74 is oriented in direction 77 at an angle φ1 relative to the centerline 78 of nozzle system 50. Throat portion 76 is oriented in direction 79 at an angle φ2 relative to the centerline 78 of nozzle system 50. In one form, directions 77 and 79 are yaw directions, wherein a thrust component in either direction 77 or 79 provide a yaw moment to vehicle 10. In other embodiments, directions 77 and 79 may be pitch directions and/or roll directions that yield respective pitch and/or roll moments to vehicle 10. In one form, angles φ1 and φ2 form a concave throat 70, e.g., concave and open to the right in the view of FIG. 2A, e.g., wherein inflection 72 is positioned to the left of throat portions 74 and 76. In other embodiments, angles φ1 and φ2 may be selected to provide a convex shape, e.g., wherein inflection 72 would be positioned to the right of throat portions 74 and 76 in FIG. 2A.

Figure 2A:
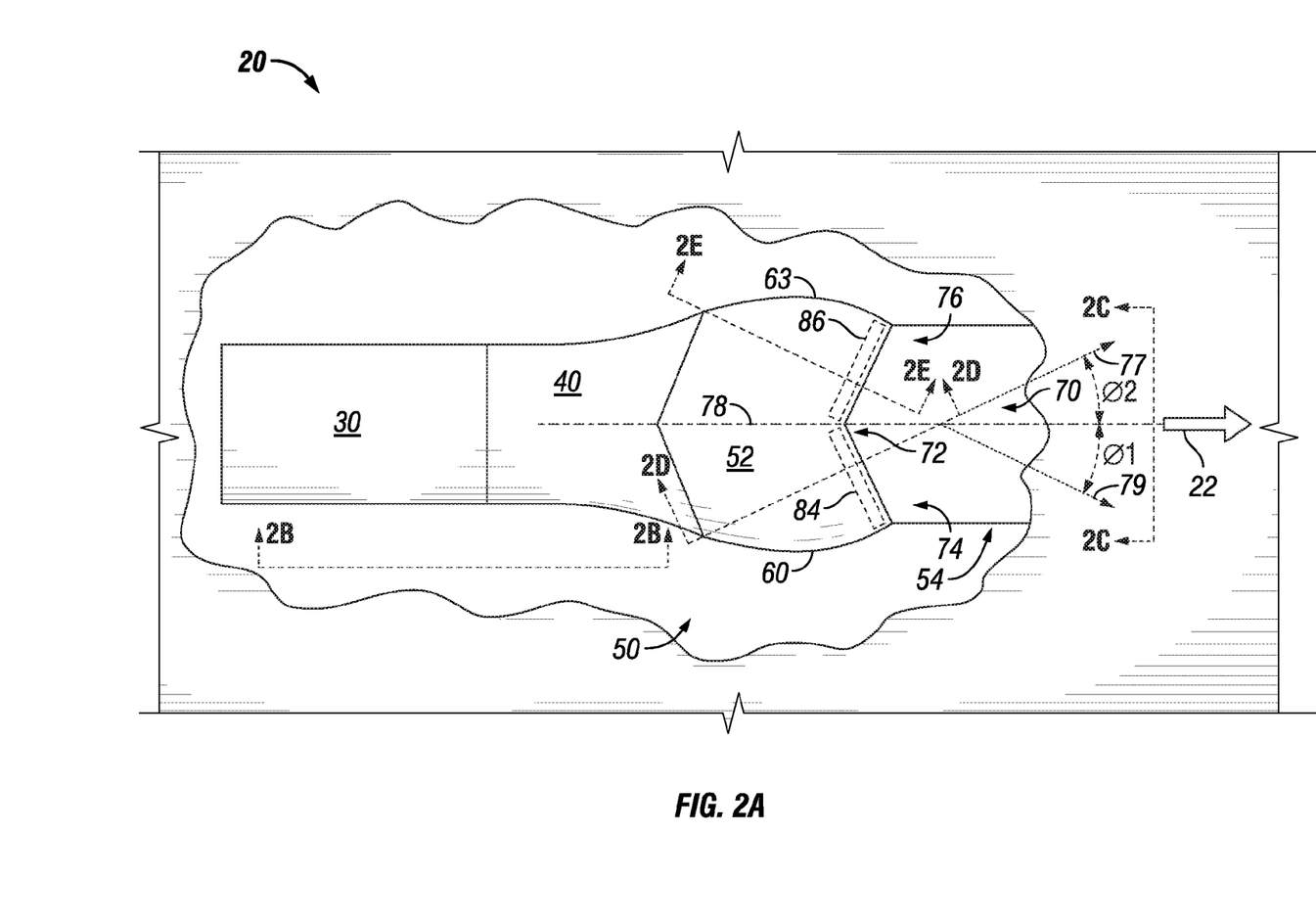
FIGS. 2A-2E schematically illustrate some aspects of a non-limiting example of a propulsion system in accordance with an embodiment of the present invention.
Figure 2B:
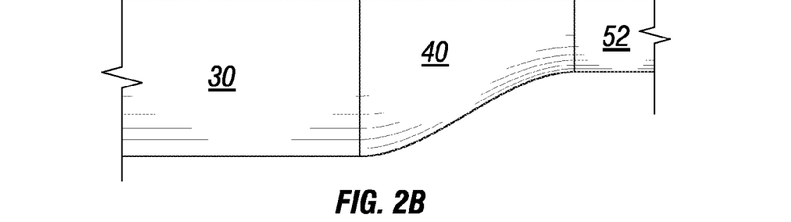
Figure 2C:
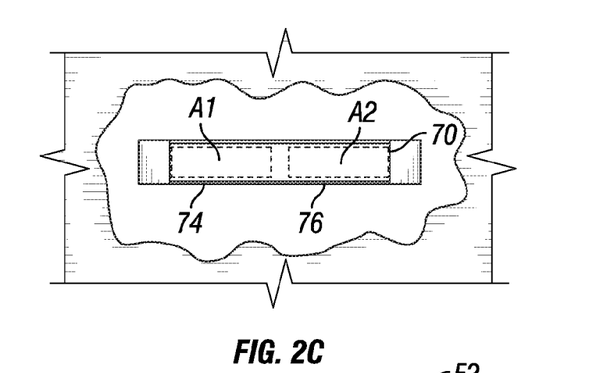
Figure 2D:
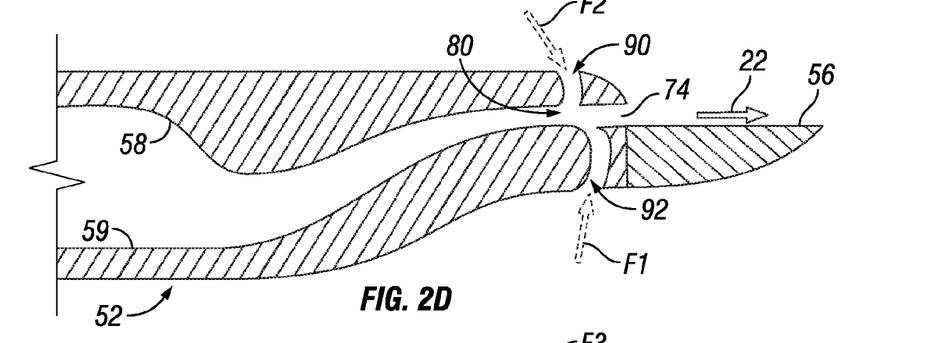
Figure 2E:
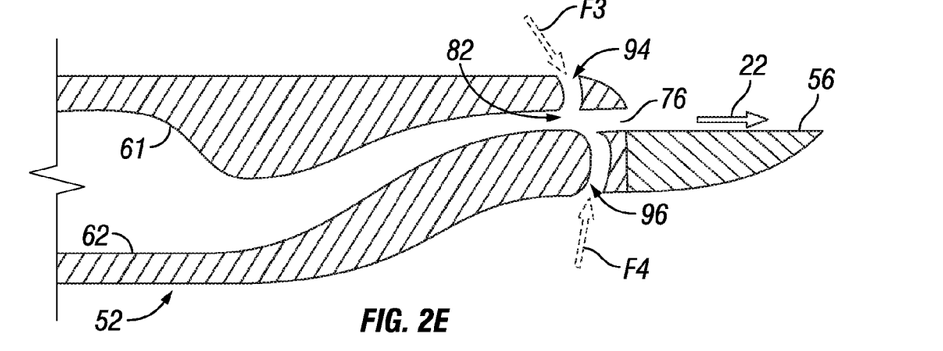

Nozzle system 50 is configured to selectively discharge the pressurized flow in direction 22. In addition, nozzle system 50 is configured to discharge a first portion of the pressurized airflow from throat portion 74 in one direction, i.e., toward direction 77; and to discharge a second portion of the pressurized airflow from the second throat portion in a different direction, i.e., toward direction 79. In some embodiments, either throat portion 74 or throat portion 76 may be perpendicular to centerline 78 or be otherwise oriented to direct pressurized flow in direction 22, whereas the other of throat portion 74 and throat portion 76 may be oriented at some non-ninety degree angle from centerline 78.

Converging nozzle 52 includes ramps (walls) 58, 59, 60, 61, 62 and 63 that define the flowpath for the pressurized flow within converging nozzle 52. Ramps 58 and 61 form upper flowpath boundaries; ramps 59 and 62 form lower flowpath boundaries; and ramps 60 and 63 form lateral flowpath boundaries. Ramp 60 is adjacent to throat portion 74. Ramp 63 is adjacent to throat portion 76. It will be understood that the terms, "upper," "lower" and "lateral" are intended to convey only relative relationships between the ramps that form converging nozzle 52 in the context of the illustrated example, not absolute positions of the ramps. It will also be understood that embodiments of the present invention may include any number of ramps having any orientation suitable for the particular application(s). In one form, ramps 58, 59, 61 and 62 are configured to shield the discharge of engine 30 from direct view, e.g., by being curved in the manner depicted in FIGS. 3D and 2E, to reduce the heat signature of propulsion system 20 and vehicle 10. In other embodiments, ramps 58, 59, 61 and 62 may not be so configured.

Ramp 60 and throat portion 74 are configured to direct a portion of the pressurized flow toward direction 77. In one form, ramp 60 extends toward direction 77 to help guide flow exiting throat portion 74 toward direction 77 for providing vectored thrust toward direction 77. In other embodiments, ramp 60 may extend in another direction to facilitate thrust vectoring in a desired direction. In still other embodiments, ramp 60 may extend parallel to centerline 78. Ramp 63 and throat portion 76 are configured to direct a portion of the pressurized flow toward direction 79. In one form, ramp 63 extends toward direction 79 to help guide flow exiting throat portion 76 toward direction 79 for providing vectored thrust toward direction 79. In other embodiments, ramp 63 may extend in another direction to facilitate thrust vectoring in a desired direction. In still other embodiments, ramp 63 may extend parallel to centerline 78.

Figure 3A:
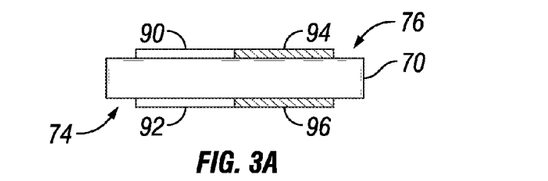
FIGS. 3A-3F schematically illustrate some combinations of activated fluidic injectors in a nozzle system for providing thrust vectoring in various directions in accordance with an embodiment of the present invention.
Figure 3B:
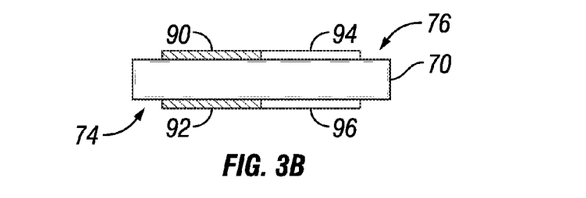
Figure 3C:
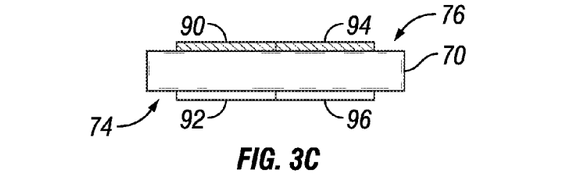
Figure 3D:
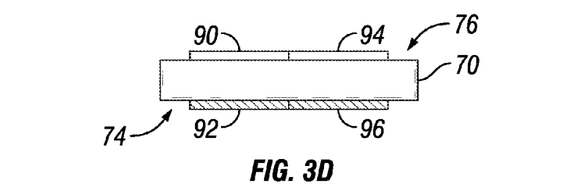
Figure 3E:
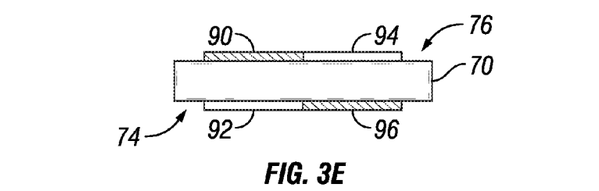
Figure 3F:
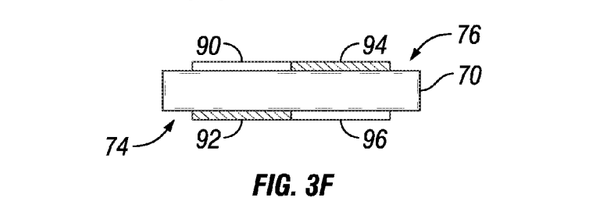
Figure 4A:
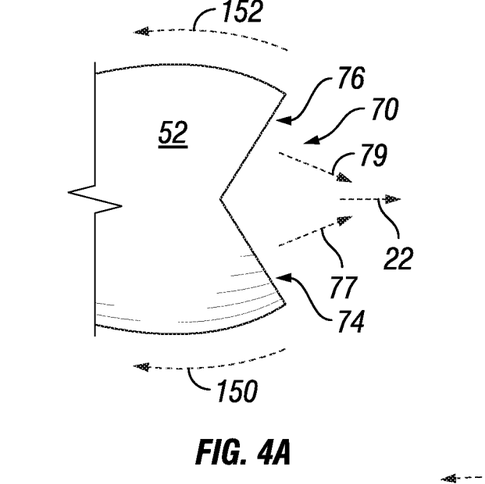
FIGS. 4A-4C schematically illustrate thrust vectors produced by the propulsion system of FIGS. 2A-2E with various combinations of activated fluidic injectors illustrated in FIGS. 3A-3F.

Referring to FIGS. 3A, 3B and 4A in conjunction with FIGS. 2A-2E, nozzle system 50 includes a fluidic injection zone 80 and a fluidic injection zone 82. Disposed with fluidic injection zone 80, proximate to throat portion 74, is a fluidic injector arrangement 84. Fluidic injector arrangement 84 is operative to alter the flow through throat portion 74. In one form, injector arrangement 84 includes an independently controllable fluidic injector 90 and an independently controllable fluidic injector 92. In other embodiments, a greater or lesser number of fluidic injectors may be employed. In one form, fluidic injector 90 and fluidic injector 92 are disposed proximate to throat portion 74 on opposite sides of throat portion 74.

Fluidic injectors 90 and 92 are operative to selectively inject fluid F1 and F2, e.g., pressurized flow received from engine 30 (for example, engine discharge flow and/or compressor/fan interstage and/or discharge flow), into the pressurized flowstream passing through nozzle 52 in proximity to throat portion 74 in order to effect thrust vectoring. In one form, fluidic injectors 90 and 92 are independently controllable by valves (not shown), and may be selectively activated via a control system (not shown).

In one form, fluidic injector arrangement 84 is configured to reduce flow through throat portion 74 by activating one or both of fluidic injectors 90 and 92 to inject fluid into the flowpath extending through throat portion 74. In one form, fluidic injectors 90 and 92 are positioned to inject fluid into the flowpath upstream of throat portion 74. In other embodiments, fluidic injectors 90 and 92 may be positioned to inject fluid in the flowpath at throat portion 74 and/or downstream of throat portion 74 in addition to or in place of fluidic injection upstream of throat portion 74.

The reduction in flow through throat portion 74 results in an increase in flow through throat portion 76, providing vectored thrust toward direction 79, which generates a moment, e.g., a yaw moment. Inflected throat 70 reduces the amount of fluidic injection required to vector thrust toward direction 79 relative to nozzles that do not have an inflected throat, e.g., since the angling of throat portion 76 tends to direct flow toward direction 79, and since the angled throat portion 76 yields a lateral pressure component at the outlet of converging nozzle 52, e.g., a pressure component directed toward centerline 78.

Disposed with fluidic injection zone 82, proximate to throat portion 76, is a fluidic injector arrangement 86. Fluidic injector arrangement 86 is operative to alter the flow through throat portion 76. In one form, injector arrangement 86 includes an independently controllable fluidic injector 94 and an independently controllable fluidic injector 96. In other embodiments, a greater or lesser number of fluidic injectors may be employed. In one form, fluidic injector 94 and fluidic injector 96 are disposed proximate to throat portion 76 on opposite sides of throat portion 76. Fluidic injectors 94 and 96 are operative to selectively inject fluid F3 and F4, e.g., pressurized flow received from engine 30 (for example, engine discharge flow and/or compressor/fan interstage and/or discharge flow), into the pressurized flowstream passing through converging nozzle 52 in proximity to throat portion 76 in order to effect thrust vectoring. In one form, fluidic injectors 94 and 96 are independently controllable by valves (not shown), and may be selectively activated via a control system (not shown). In one form, fluidic injector arrangement 86 is configured to reduce flow through throat portion 76 by activating one or both of fluidic injectors 94 and 96 to inject fluid into the flowpath extending through throat portion 76.

In one form, fluidic injectors 94 and 96 are positioned to inject fluid into the flowpath upstream of throat portion 76. In other embodiments, fluidic injectors 94 and 96 may be positioned to inject fluid in the flowpath downstream of throat portion 76 in addition to or in place of fluidic injectors upstream of throat portion 76. The reduction in flow through throat portion 76 results in an increase in flow through throat portion 74, providing vectored thrust toward direction 77, which generates a moment, e.g., a yaw moment. Inflected throat 70 reduces the amount of fluidic injection required to vector thrust in direction 77 relative to nozzles that do not have an inflected throat, e.g., since the angling of throat portion 76 tends to direct flow toward direction 79, and since the angled throat portion 76 yields a lateral pressure component at the outlet of converging nozzle 52, e.g., a pressure component directed toward centerline 78.

Nozzle system 50 is configured to direct thrust in primary thrust direction 22 when fluidic injectors 90, 92, 94 and 96 are not activated. Nozzle system 50 may be configured to direct thrust to generate yaw, pitch and/or roll moments, e.g., as set forth herein. For example, nozzle system 50 is configured to provide vectored thrust in the yaw direction, e.g., as set forth above, by selectively activating either fluidic injectors 90 and 92, or fluid injectors 94 and 96.

Figure 4B:
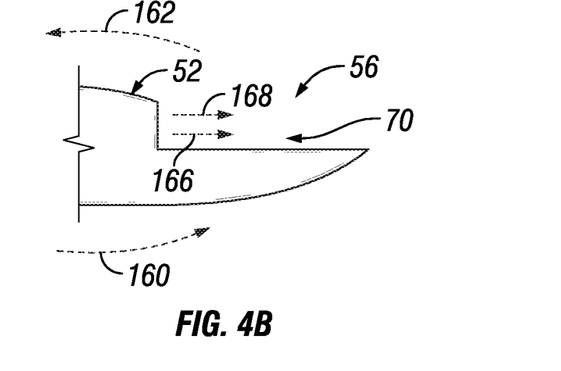
Figure 4C:
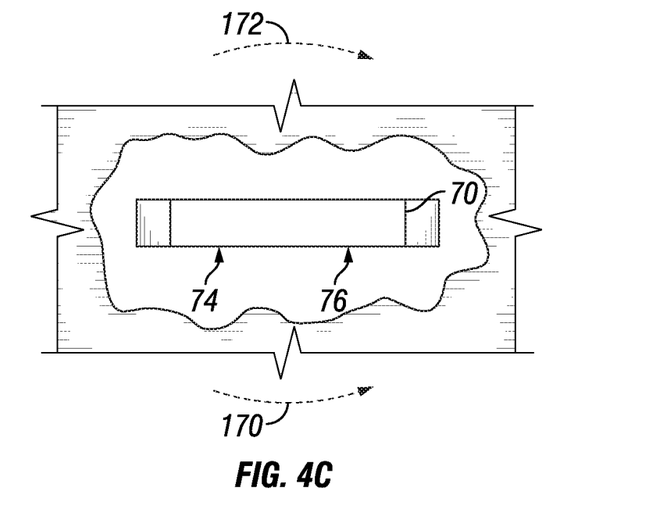

In various embodiments, performing fluidic injection via different combinations of fluidic injectors may be used to provide yaw, pitch and/or roll control of vehicle 10 via propulsion system 20, for example, as illustrated in FIGS. 3A-3F and FIGS. 4A-4C. FIGS. 3A-3F depict an aft end view of propulsion system 20, having a direction of view similar to the direction of view of FIG. 2C. FIGS. 3A-3F schematically illustrate some different combinations of fluidic injectors that may be employed to provide yaw, pitch and roll control of vehicle 10. Other embodiments may use other combinations of a greater or lesser number of fluidic injectors to provide yaw, pitch and/or roll control of vehicle 10. FIG. 4A represents a top view of part of propulsion system 20, having a direction of view similar to that of FIGS. 1 and 2A. FIG. 4B represents an aft end view of part of propulsion system 20, having a direction of view similar to that of FIG. 2B. FIG. 4C represents an aft end view of part of propulsion system 20, having a direction of view similar to that of FIG. 2C.

In one form, nozzle system 50 is configured generate a yaw moment in yaw direction 150 by increasing flow through throat portion 74 by activating one or both of fluidic injectors 94 and 96 to reduce flow through the throat portion 76. In one form, nozzle system 50 is also configured generate a yaw moment in yaw direction 152 by increasing flow through throat portion 76 by activating one or both of fluidic injectors 90 and 92 to reduce flow through throat portion 74. In one form, fluidic injectors 90 and 92 cooperate to reduce flow through the throat portion 74, and fluidic injectors 94 and 96 cooperate to reduce flow through the throat portion 76. In other embodiments, only one of fluidic injectors 90 and 92 may be employed to reduce flow through throat portion 74, and only one of fluidic injectors 94 and 96 may be employed to reduce flow through throat portion 76. Fluidic injection through fluidic injectors 90 and 92 is operative to direct a portion of the pressurized airflow in converging nozzle 52 toward direction 79, generating a yaw moment in yaw direction 152. Fluidic injection through fluidic injectors 94 and 96 is operative to direct a portion of the pressurized airflow in converging nozzle 52 toward direction 77, generating a yaw moment in yaw direction 150. Thus, as illustrated in FIGS. 3A, 3B and 4A, propulsion system 20 generates a yaw moment in one yaw direction by performing fluidic injection through a first combination of the fluidic injectors, and generates a yaw moment in a second yaw direction by performing fluidic injection through a second combination of the fluidic injectors.

In one form, nozzle system 50 is also configured to generate pitch moments in different directions. For example, referring to FIGS. 3C, 3D and 4B, nozzle system 50 is configured to generate a pitch moment in pitch direction 162 by activating the fluidic injectors 90 and 94, which directs flow, illustrated by arrow 166, through the portion of throat 70 adjacent to single expansion ramp 56. In some embodiments, nozzle system 50 is also configured to generate a pitch moment in pitch direction 160 by activating fluidic injectors 92 and 96, which directs flow, illustrated by arrow 168, through a portion of throat 70 opposite to single expansion ramp 56. Thus, in one form, propulsion system 20 generates a pitch moment in one pitch direction by performing fluidic injection through a third combination of the fluidic injectors; and generates a pitch moment in another pitch direction by performing fluidic injection through a fourth combination of the fluidic injectors.

In some embodiments, nozzle system 50 may also be configured to generate roll moments in different directions. For example, referring to FIGS. 3E, 3F and 4C, nozzle system 50 may be configured to generate a roll moment in roll direction 172, e.g., by activating the fluidic injectors 90 and 96 to direct some of the pressurized flow through a portion of throat portion 74 adjacent to single expansion ramp 56, e.g., as illustrated by arrow 166; and to direct some of the pressurized flow through a portion of throat portion 76 opposite to single expansion ramp 56, e.g., as illustrated by arrow 168. In addition, in some embodiments, nozzle system 50 may be configured to generate a roll moment in roll direction 170, e.g., by activating the fluidic injectors 92 and 94 to direct some of the pressurized flow through a portion of throat portion 74 opposite to single expansion ramp 56, e.g., as illustrated by arrow 168; and to direct some of the pressurized flow through a portion of throat portion 76 adjacent to single expansion ramp 56, e.g., as illustrated by arrow 166. Thus, nozzle system 50 may be configured to generate a roll moment in one roll direction by performing fluidic injection through a fifth combination of the fluidic injectors, and generate a roll moment in another roll direction by performing fluidic injection through a sixth combination of the fluidic injectors.

Embodiments of the present invention include a flight vehicle, comprising: a flight structure; an engine mounted to the flight structure and configured to discharge a pressurized flow for providing propulsive thrust to the flight structure; a nozzle system configured to receive and accelerate the pressurized flow, wherein the nozzle system includes a converging nozzle and a throat having: an inflection; a first throat portion extending from one side of the inflection and providing a first throat flow area; and a second throat portion extending from another side of the inflection and providing a second throat flow area, wherein the first throat portion and the second throat portion each face in different directions, wherein the nozzle system is configured to discharge a first portion of the pressurized flow from the first throat portion in a first direction, and to discharge a second portion of the pressurized flow from the second throat portion in a second direction different from the first direction.

In a refinement, the flight vehicle further comprises a transition duct configured to transition the pressurized flow from a first flow area geometry to a second flow area geometry corresponding to the converging nozzle.

In another refinement, the nozzle system further includes a diverging nozzle.

In yet another refinement, the diverging nozzle is a single expansion ramp nozzle.

In still another refinement, the converging nozzle includes a first ramp adjacent to the first throat portion and extending toward the first direction, wherein the first ramp and the first throat portion are configured to direct the first portion of the pressurized flow in the first direction.

In yet still another refinement, the converging nozzle includes a second ramp adjacent to the second throat portion and extending toward the second direction, wherein the second ramp and the second throat portion are configured to direct the second portion of the pressurized flow in the second direction.

In a further refinement, the flight vehicle further comprises a first fluidic injector arrangement and a second fluidic injector arrangement, wherein the first fluidic injector arrangement is proximate to the first throat portion and operative to reduce flow through the first throat portion; wherein the second fluidic injector arrangement is proximate to the second throat portion and operative to reduce flow through the second throat portion; wherein fluidic injection through the first fluidic injector arrangement is operative to direct the second portion of the pressurized flow in the second direction; and wherein fluidic injection through the second fluidic injector arrangement is operative to direct the first portion of the pressurized flow in the first direction.

In a yet further refinement, the first fluidic injector arrangement includes first fluidic injectors on opposite sides of the first throat portion; wherein the second fluidic injector arrangement includes second fluidic injectors on opposite sides of the second throat portion; wherein the first fluidic injectors cooperate to reduce flow through the first throat portion; and wherein the second fluidic injectors cooperate to reduce flow through the second throat portion.

In a still further refinement, the flight vehicle further comprises a plurality of independently controllable fluidic injectors proximate to the throat, wherein the nozzle system is configured to: generate a yaw moment in a first yaw direction by performing fluidic injection through a first combination of the fluidic injectors; and generate a yaw moment in a second yaw direction by performing fluidic injection through a second combination of the fluidic injectors.

In a yet still further refinement, the nozzle system is configured to: generate a pitch moment in a first pitch direction by performing fluidic injection through a third combination of the fluidic injectors; and generate a pitch moment in a second pitch direction by performing fluidic injection through a fourth combination of the fluidic injectors.

In another refinement, the nozzle system is configured to: generate a roll moment in a first roll direction by performing fluidic injection through a fifth combination of the fluidic injectors; and generate a roll moment in a second roll direction by performing fluidic injection through a sixth combination of the fluidic injectors.

Embodiments of the present invention include a propulsion system, comprising: an engine configured to discharge a pressurized flow; a nozzle system configured to receive a pressurized flow, wherein the nozzle system includes a nozzle, an inflected throat and at least two fluidic injection zones, wherein the inflected throat includes a first throat portion having a first throat flow area, and a second throat portion having a second throat flow area, wherein the first throat portion and the second throat portion face different directions, wherein the nozzle system is configured to discharge a first portion of the pressurized flow from the first throat portion in a first direction by reducing flow through the second throat portion using at least a second fluidic injection zone, and to discharge a second portion of the pressurized flow from the second throat portion in a second direction different from the first direction by reducing flow through the first throat portion using at least a first fluidic injection zone.

In a refinement, the propulsion system further comprises a plurality of independently controllable fluidic injectors, including a first fluidic injector positioned in the first fluidic injection zone proximate to the first throat portion and a second fluidic injector positioned in the second fluidic injection zone proximate to the second throat portion, wherein the first fluidic injector is operable to reduce flow through the first throat portion; and the second fluidic injector is operable to reduce flow through the second throat portion.

In another refinement, the nozzle system is configured to direct thrust in a primary thrust direction when no fluidic injectors are activated.

In yet another refinement, the nozzle system is configured generate a yaw moment in a first yaw direction by increasing flow through the first throat portion by activating the second fluidic injector to reduce flow through the second throat portion; and to generate a yaw moment in a second yaw direction by increasing flow through the second throat portion by activating the first fluidic injector to reduce flow through the first throat portion.

In still another refinement, the propulsion system further comprises: a third fluidic injector in the first fluidic injection zone proximate to the first throat portion and positioned across the first throat portion opposite to the first fluidic injector; and a fourth fluidic injector in the second fluidic injection zone proximate to the second throat portion and positioned across the second throat portion opposite to the second fluidic injector, wherein the nozzle system is configured to: generate a yaw moment in a first yaw direction by increasing flow through the first throat portion by activating the second fluidic injector and the fourth fluidic injector to reduce flow through the second throat portion; and to generate a yaw moment in a second yaw direction by increasing flow through the second throat portion by activating the first fluidic injector and the third fluidic injector to reduce flow through the first throat portion; and generate a pitch moment in a first pitch direction by activating the first fluidic injector and the second fluidic injector; and to generate a pitch moment in a second pitch direction by activating the third fluidic injector and the fourth fluidic injector.

In yet still another refinement, the nozzle system is configured to generate a roll moment in a first roll direction by activating the first fluidic injector and the fourth fluidic injector; and to generate a roll moment in a second roll direction by activating the second fluidic injector and the third fluidic injector.

In a further refinement, the inflected throat is continuous as between the first throat portion and the second throat portion.

In a yet further refinement, the first throat portion and the second throat portion lie in the same plane.

Embodiments of the present invention include a thrust vectoring system, comprising: a nozzle system configured to receive a pressurized flow and accelerate the pressurized flow, wherein the nozzle system includes: means for generating a yaw moment in a first yaw direction using the pressurized flow; and means for generating a yaw moment in a second yaw direction using the pressurized flow.

In a refinement, the thrust vectoring system further comprises: means for generating a pitch moment in a first pitch direction using the pressurized flow; and means for generating a pitch moment in a second pitch direction using the pressurized flow.

In another refinement, the thrust vectoring system further comprises: means for generating a roll moment in a first roll direction using the pressurized flow; and means for generating a roll moment in a second roll direction using the pressurized flow.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A propulsion system, comprising:
   an engine configured to discharge a pressurized flow;
   a nozzle system configured to receive the pressurized flow, wherein the nozzle system includes a nozzle, an inflected throat and at least two fluidic injection zones, wherein the inflected throat includes a first throat portion having a first throat flow area, and a second throat portion having a second throat flow area, wherein the first throat portion and the second throat portion face different directions,
   wherein the nozzle system is configured to discharge a first portion of the pressurized flow from the first throat portion in a first direction by reducing flow through the second throat portion using at least a second fluidic injection zone, and to discharge a second portion of the pressurized flow from the second throat portion in a second direction different from the first direction by reducing flow through the first throat portion using at least a first fluidic injection zone,
   further comprising a plurality of independently controllable fluidic injectors, including a first fluidic injector positioned in the first fluidic injection zone proximate to the first throat portion and a second fluidic injector positioned in the second fluidic injection zone proximate to the second throat portion, wherein the first fluidic injector is operable to reduce flow through the first throat portion; and the second fluidic injector is operable to reduce flow through the second throat portion,
   further comprising:
   a third fluidic injector in the first fluidic injection zone proximate to the first throat portion and positioned across the first throat portion opposite to the first fluidic injector; and
   a fourth fluidic injector in the second fluidic injection zone proximate to the second throat portion and positioned across the second throat portion opposite to the second fluidic injector,
   wherein the nozzle system is configured to:
   generate a yaw moment in a first yaw direction by increasing flow through the first throat portion by activating the second fluidic injector and the fourth fluidic injector to reduce flow through the second throat portion; and to generate a yaw moment in a second yaw direction by increasing flow through the second throat portion by activating the first fluidic injector and the third fluidic injector to reduce flow through the first throat portion; and
   generate a pitch moment in a first pitch direction by activating the first fluidic injector and the second fluidic injector; and to generate a pitch moment in a second pitch direction by activating the third fluidic injector and the fourth fluidic injector.

2. The propulsion system of claim 1, wherein the nozzle system is configured to direct thrust in a primary thrust direction when no fluidic injectors are activated.

3. The propulsion system of claim 1, wherein the nozzle system is configured generate a yaw moment in a first yaw direction by increasing flow through the first throat portion by activating the second fluidic injector to reduce flow through the second throat portion; and to generate a yaw moment in a second yaw direction by increasing flow through the second throat portion by activating the first fluidic injector to reduce flow through the first throat portion.

4. The propulsion system of claim 1, wherein the nozzle system is configured to generate a roll moment in a first roll direction by activating the first fluidic injector and the fourth fluidic injector; and to generate a roll moment in a second roll direction by activating the second fluidic injector and the third fluidic injector.

5. The propulsion system of claim 1, wherein the inflected throat is continuous as between the first throat portion and the second throat portion.

6. The propulsion system of claim 1, wherein the first throat portion and the second throat portion lie in the same plane.

7. A propulsion system, comprising:
an engine configured to discharge a pressurized flow;
a nozzle system configured to receive the pressurized flow, wherein the nozzle system includes a nozzle, an inflected throat and at least two fluidic injection zones, wherein the inflected throat includes a first throat portion having a first throat flow area, and a second throat portion having a second throat flow area, wherein the first throat portion and the second throat portion face different directions,
wherein the nozzle system is configured to discharge a first portion of the pressurized flow from the first throat portion in a first direction by reducing flow through the second throat portion using at least a second fluidic injection zone, and to discharge a second portion of the pressurized flow from the second throat portion in a second direction different from the first direction by reducing flow through the first throat portion using at least a first fluidic injection zone,
wherein the first throat portion extends from an inflection of the throat in one direction, and wherein the second throat portion extends from the inflection of the throat in another direction.

8. The propulsion system of claim 7, further comprising a plurality of independently controllable fluidic injectors, including a first fluidic injector positioned in the first fluidic injection zone proximate to the first throat portion and a second fluidic injector positioned in the second fluidic injection zone proximate to the second throat portion, wherein the first fluidic injector is operable to reduce flow through the first throat portion; and the second fluidic injector is operable to reduce flow through the second throat portion.

9. The propulsion system of claim 8, wherein the nozzle system is configured to direct thrust in a primary thrust direction when no fluidic injectors are activated.

10. The propulsion system of claim 8, wherein the nozzle system is configured generate a yaw moment in a first yaw direction by increasing flow through the first throat portion by activating the second fluidic injector to reduce flow through the second throat portion; and to generate a yaw moment in a second yaw direction by increasing flow through the second throat portion by activating the first fluidic injector to reduce flow through the first throat portion.

11. The propulsion system of claim 8, further comprising:
a third fluidic injector in the first fluidic injection zone proximate to the first throat portion and positioned across the first throat portion opposite to the first fluidic injector; and
a fourth fluidic injector in the second fluidic injection zone proximate to the second throat portion and positioned across the second throat portion opposite to the second fluidic injector,
wherein the nozzle system is configured to:
generate a yaw moment in a first yaw direction by increasing flow through the first throat portion by activating the second fluidic injector and the fourth fluidic injector to reduce flow through the second throat portion; and to generate a yaw moment in a second yaw direction by increasing flow through the second throat portion by activating the first fluidic injector and the third fluidic injector to reduce flow through the first throat portion; and
generate a pitch moment in a first pitch direction by activating the first fluidic injector and the second fluidic injector; and to generate a pitch moment in a second pitch direction by activating the third fluidic injector and the fourth fluidic injector.

12. The propulsion system of claim 11, wherein the nozzle system is configured to generate a roll moment in a first roll direction by activating the first fluidic injector and the fourth fluidic injector; and to generate a roll moment in a second roll direction by activating the second fluidic injector and the third fluidic injector.

13. The propulsion system of claim 7, wherein the inflected throat is continuous as between the first throat portion and the second throat portion.

14. The propulsion system of claim 7, wherein the first throat portion and the second throat portion lie in the same plane.

* * * * *